Feb. 1, 1966     OLE-BENDT RASMUSSEN     3,233,029
METHOD OF COLD-STRETCHING ORIENTABLE SHEET MATERIAL
Filed June 8, 1962
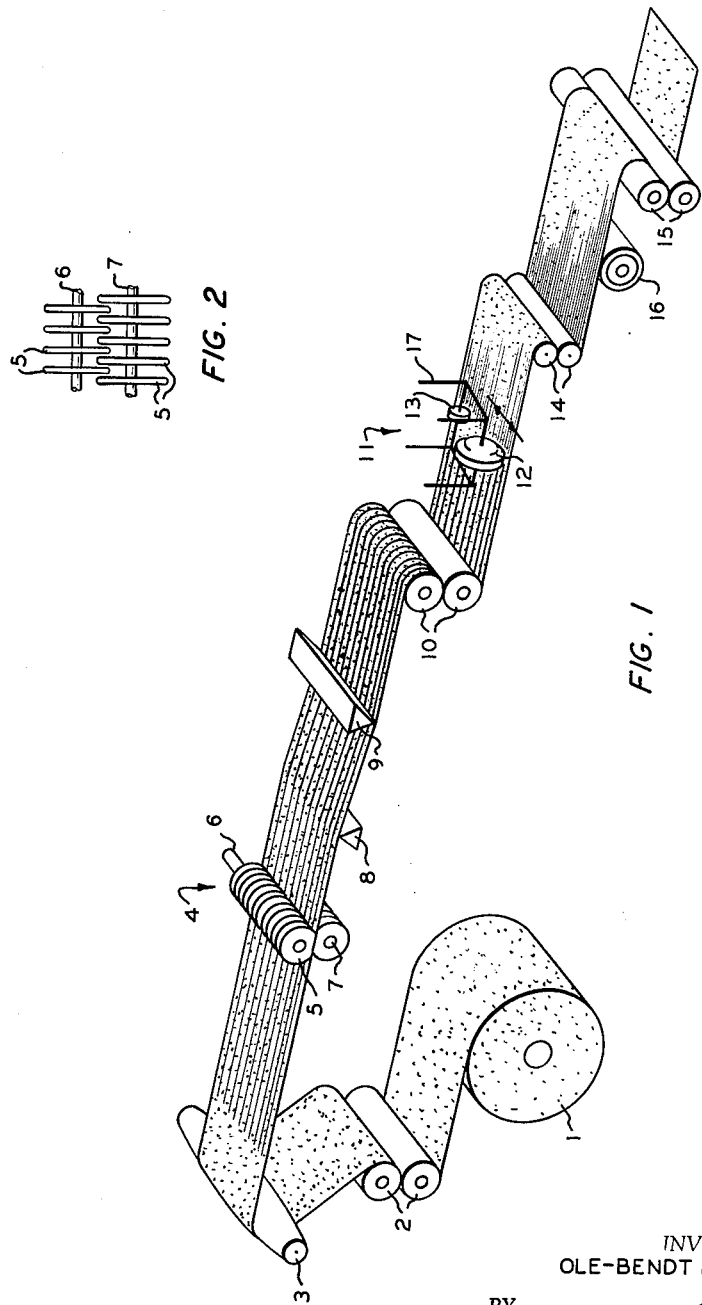
INVENTOR.
OLE-BENDT RASMUSSEN
BY Young & Quigg
ATTORNEYS United States Patent Office 3,233,029
Patented Feb. 1, 1966

3,233,029
METHOD OF COLD-STRETCHING ORIENTABLE SHEET MATERIAL
Ole-Bendt Rasmussen, Charlottenlund, Denmark, assignor to Phillips Petroleum Company, Bartlesville, Okla., a corporation of Delaware
Filed June 8, 1962, Ser. No. 201,205
Claims priority, application Denmark, June 9, 1961, 2,353/61
4 Claims. (Cl. 264—288)

This invention relates to a method of cold-stretching a sheet material, which can be oriented, in which an even and uniform stretching is obtained over the whole width of the sheet or film without any risk of bursting and, accordingly, maximal stretching can be obtained in a single continuous stretching process.

It is known that in many plastic materials stretching produces orientation of the molecules in the direction of stretching, and that the physical character of the material may thus be changed, e.g., the tensile strength.

In particular, this is true for the linear polymers of high molecular weight, of which polyalkylenes and polyamides are typical representatives.

The stretching of a sheet occurs in a narrow zone across the direction of stretching (the necking-down zone), and as simultaneously a strong contraction in the width of the sheet takes place, it will be almost impossible to get the material uniformly stretched over its whole width and at the same time obtain a maximal stretching without rupturing the sheet.

It has been proposed to obviate these difficulties by spacing the pairs of rolls, between which the stretching zone is positioned, very far apart, for example at a distance of up to 70 times the width of the film, and to localize the stretching zone far beyond the middle of this distance, since it has been found that the sheet material will thus voluntarily form soft longitudinal folds between the supply rolls and the stretching zone, thus partly equalizing the variations in the direction of the tensile force, which results from the contraction in width. A total equalization cannot, however, be attained, and the apparatus is inordinately bulky.

The invention is based upon the idea that it is possible by a forced creation of said folds, partly to reduce the length of the apparatus to a reasonable size, and partly to control the folding, so that the latter takes place quite uniformly over the whole width of the sheet. The characteristic feature of the invention is, accordingly, that the material is introduced in the stretching zone in a pleated state, a lengthwise pleating by means of a pleating mechanism being imparted to the sheet over the whole width to such an extent that the width of the sheet is reduced by an amount substantially corresponding to the contraction in width resulting from the stretching. Thus, the tensile force is uniformly distributed upon each single fold, i.e., the folding is in fact equal to a subdivision of the film into a great many narrow bands, whereby the possibility of oblique tensile forces is correspondingly reduced.

It is known that in certain cases it is advantageous to carry out the stretching at as low a temperature as technically possible. For example, this applies to the production of multi-ply stretched and cross-laminated sheets, when a particularly high tear strength is desired. Hitherto, the possibilities of stretching wide sheets at exceedingly low temperatures have been strongly limited, owing to the necking-down zone becoming narrower, the lower the temperature is. By using the present method it has been found possible to stretch low-pressure polyethylene and isotactic polypropylene of the most high-crystalline qualities in the market at about 0° C. and in the ratio of 1:4.

In a preferred embodiment of the present method, the tensional stretching forces can be further equalized, according to the invention, by first carrying out a coarse pleating, which is then changed into a fine pleating by successively straightening the single pleats in the coarse pleating by a regional stress, which is shifted over the width of the sheet, and which on the seat of action presses the sheet material so far out of the sheet plane that the coarse pleats are straightened, the material then voluntarily pleating finely when the stress has passed on to the next pleat.

According to the invention, an equal stretching action even to the borders of the sheet can be attained by supplying the sheet to the pleating apparatus over a crown roll. Between this roll and the pleating apparatus, the distance between the borders of the sheet is reduced by an amount corresponding to the reduction in the width of the sheet produced by the stretching. By adjusting the crown in the roll in relation to the distance between said roll and the pleating apparatus, it is made possible that the distance from a plane through the pleating mechanism perpendicular to the longitudinal direction of the sheet to any point of the generatrix along which the sheet leaves the crown roll, remains the same and that the stress upon the borders thus does not exceed that in the middle of the sheet.

According to the invention, the material can also be subjected to a strong cooling in the stretching zone. This is of importance in materials which generate a great amount of heat when stretched at low temperature.

FIGURE 1 of the drawing diagrammatically illustrates the process of the invention.

FIGURE 2 of the drawing illustrates one form of apparatus for pleating a sheet to be stretched.

Referring to FIGURE 1, the unstretched sheet is supplied from a supply roll 1 and passes over a pair of rolls 2, of which one or both are driven, thus ensuring an even and uniform supply of the sheet. From the pair of rolls 2, the sheet passes over a crown roll 3 to a pleating mechanism 4 consisting of two sets of discs 5, which are thus mounted spaced apart upon shafts 6 and 7 over and under the sheet, so that the discs in one set mesh between the discs in the other set, the distance between the shafts 6 and 7 being somewhat less than the diameter of the discs. This relationship is shown in more detail in FIGURE 2. The plane of each disc is parallel to the feed direction of the sheet, and one set of the discs is preferably driven at a peripheral speed slightly exceeding the speed of the sheet. Thus, the discs produce coarse longitudinal folds or convolutions in the sheet. The latter then passes over the rim of a crossbeam 8, the effect of which is to press the convolutions into pleats, this action being aided by another crossbeam 9 acting upon the opposite surface of the pleated sheet.

The sheet, which is now coarsely pleated, can then be finely pleated. After passing over another pair of rolls 10, the sheet reaches an assembly mechanism 11 which produces the fine pleating. In the embodiment shown in the drawing, the important parts of this assembly are a large disc 12 with a rounded edge, which can be shifted across the film, and a smaller, almost ball-shaped disc 13 positioned to follow behind disc 12. Discs 12 and 13 are rotatably mounted on a carrier 17. A series of such assemblies may be attached to an endless chain carrying the assemblies across the film, so that one assembly contacts the film before the previous one leaves. However, it is also possible to use a single assembly reciprocating across the film, whereby the disc 13 is turned over to follow behind the disc 12 whenever the latter changes its direction, or a disc 13 may be placed on each side of the disc 12 and displaceable in a vertical direction in such a manner that only the one disc 13, which at a given time is behind the disc 12, is in contact with the sheet.

The disc 12 presses so strongly upon the sheet that the pleat, with which it is in contact, is straightened. When the disc 12 is shifted to the next pleat, the straightened material in the abandoned pleat, will again wrinkle, but now it will form a lot of fine pleats, which are then turned over and pressed down by the following disc 13.

The finely pleated sheet then passes into the part of the apparatus, where the stretching is to be carried out. This is accomplished over a pair of rolls 14, of which at least one is driven with substantially the same peripheral speed as the speed of the entering sheet, and which are pressed so strongly together that the sheet cannot slide. The stretching is carried out by means of a pair of rolls 15, the peripheral speed of which is as many times greater than that of the pair of rolls 14, as corresponds to the desired degree of stretching. To localize the stretching zone proper, a felt coated roll 16 is provided, which is adapted so that the felt can always be kept wet, for example by the roll being hollow with a perforated metal mantle beneath the felt coating, and liquid being supplied through the roll shaft.

The moistening serves to even out the friction as the pleats gradually disappear during the contraction taking place during the stretching. The displacements of material taking place as a result of the stretching should as far as possible take place equally easily all over the width of the stretching zone in order to reduce the risk of rupturing the film.

The moistening also serves to produce a rapid and uniform cooling of the necking-down zone. This is of importance, for example, when high-crystalline polyethylene or polypropylene is being stretched, because these high-crystalline substances on stretching generate a great amount of heat that has to be removed in order not to make the orientation irregular. However, the said heat is removed by roll 16, which may further be cooled below room temperature.

By adapting the pair of rolls 15 to be driven with changeable peripheral speed, the stretching can be adjusted so that the fine pleats in the sheet contain just sufficient material to be fully straightened out during the stretching so that the stretched sheet leaves the apparatus in a perfectly smooth state.

What I claim is:

1. In a method of cold stretching a sheet of orientable plastic material in which said sheet is stretched lengthwise sufficiently to cause substantial contraction in the width of said sheet, the improvement which comprises forming multiple lengthwise convolutions across the width of said sheet, smoothing said convolutions into pleats thereby reducing the distance between the edges of said sheet, and stretching the pleated sheet sufficiently to remove said pleats as a result of the contraction in sheet width, said distance between the edges of the pleated sheet being substantially the same as the final width of the stretched sheet.

2. The method of claim 1 wherein said folds are first smoothed into large pleats which are each then converted into multiple fine pleats by successively removing each large pleat along a length of said sheet by locally pressing said sheet out of a plane in which it is held by longitudinal tension and moving said pressing action across the width of said sheet so that as said action is removed from a region from which a large pleat has been removed, that region of the sheet is permitted to reform into said fine pleats.

3. The method of claim 1 wherein said sheet is passed over a crown roll before forming said convolutions.

4. The method of claim 1 wherein said sheet is cooled as it is stretched.

References Cited by the Examiner

UNITED STATES PATENTS

| | | | |
|---|---|---|---|
| 2,547,736 | 4/1951 | Blake | 18—48 |
| 2,547,763 | 4/1951 | Land et al. | 18—48 |
| 3,004,284 | 10/1961 | Limbach | 18—1 |
| 3,019,475 | 2/1962 | Smith | 18—1 |

ALEXANDER H. BRODMERKEL, *Primary Examiner.*